April 26, 1927.
R. B. MORAN ET AL
1,626,249
ROTARY CORE DRILL
Filed July 1, 1924
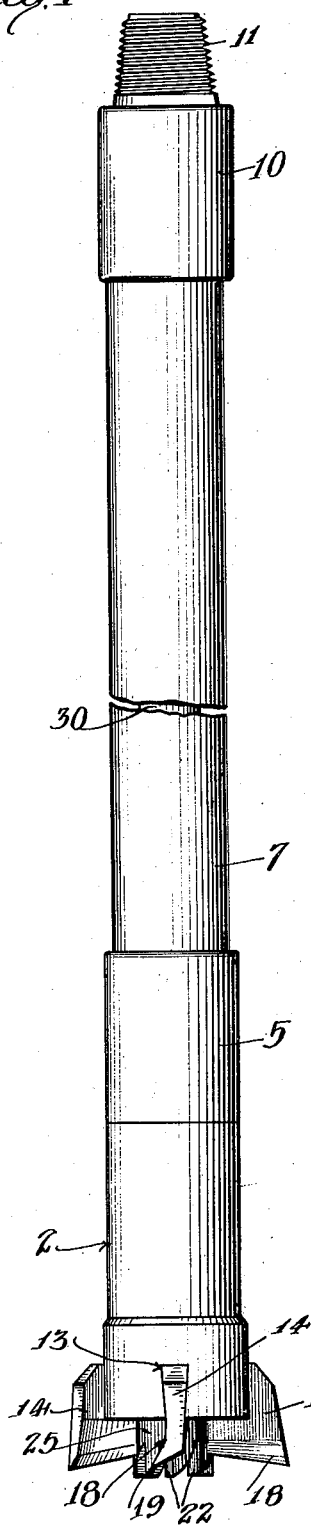
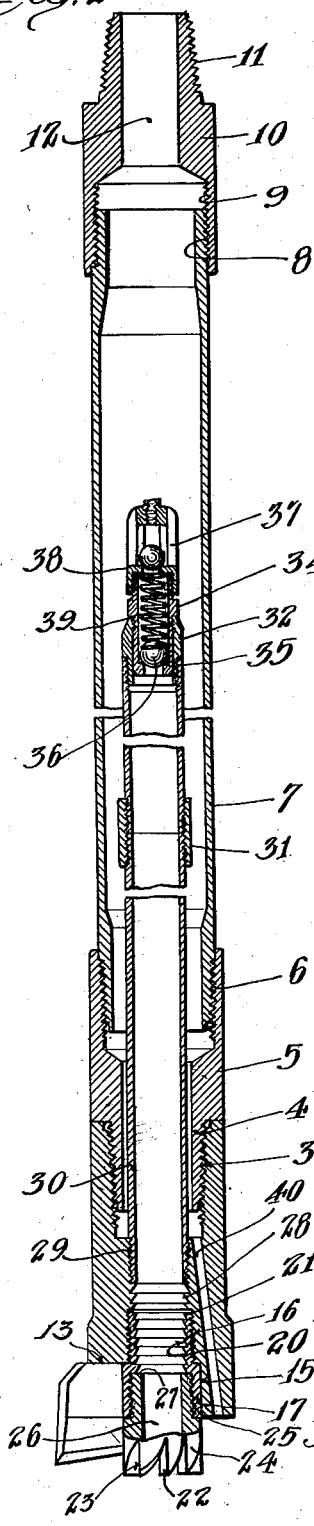
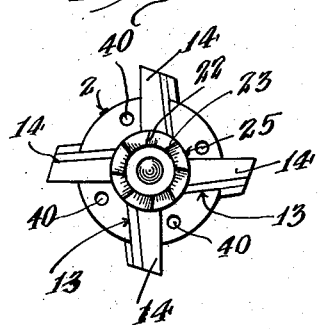
Inventors
Robert B. Moran
Arthur F. Spengler
By Lyon & Lyon
Attorneys Patented Apr. 26, 1927.

1,626,249

UNITED STATES PATENT OFFICE.

ROBERT B. MORAN AND ARTHUR F. SPENGLER, OF LOS ANGELES, CALIFORNIA, ASSIGNORS TO SPENGLER CORE DRILLING COMPANY, OF LOS ANGELES, CALIFORNIA, A CORPORATION OF CALIFORNIA.

ROTARY CORE DRILL.

Application filed July 1, 1924. Serial No. 723,454.

This invention relates to rotary core drills, and refers particularly to the type of drills employed for forming and extracting a core from a well such as an oil well to determine the nature of the formation encountered.

This application is a continuation in part of our copending application, Serial No. 643,932, filed June 7, 1923.

An object of the present invention is to provide an efficient and economical means of securing the outer cutters of the core drill to the body of the drill.

Another object of the present invention is to provide a rotary core drill in which the core form will be permitted to abruptly expand upon being formed so as to release the pressure or the sides thereof so the core will maintain its natural structure in the core drill, and also to provide a means whereby the core formed may be held in the drill.

A further object of the present invention is to provide an assemblage, combination or arrangement of core drill parts by which the various elements of the core drill may be readily assembled together and which the wear parts of the core drill may be replaced at a low cost without substantial removal of the unworn material.

Other objects and advantages of the present invention will be apparent from a description of a preferred form of illustration of the core drill embodying the invention and will present themselves to the practice and use of the invention.

In the accompanying drawings a preferred form or assemble of a core drill embodying the invention is illustrated.

In the drawings:

Figure 1 is an elevation of the rotary core drill.

Fig. 2 is an elevation mainly in vertical longitudinal section,

Fig. 3 is a bottom view of the core drill, and

Fig. 4 is a perspective of one of the outer cutters of the drill.

Referring to the drawings, the drill comprises a body or hollow tool carrying shoe 2, having a threaded tapered socket 3 at its upper end secured to a tapered pin 4 of a tool joint 5. The tool joint 5 has a threaded socket 6 at its upper end by which the tool joint is threaded to the lower end of a tubular shank 7, which may be of any desired length, and in usual practice is made up of a number of sections of drill pipe, the shank 7 being threaded at its upper end 8 within a socket 9 of a tool joint 10 having a tapered pin 11 at its upper end, the tool joint 10 having a central bore 12.

The lower end of the body or hollow shoe 2 is provided with a number of substantially radially extending ways 13 into which outer cutters 14 of the core drill are dovetailed. The side walls of the ways 13 in addition to their downward taper are slightly tapered or converged outwardly to provide a seat for the cutters 14. The upper portions of the opposed walls of the cutter 14, which fit within the ways 13, correspondingly converge outwardly to provide a tapering engagement with the side walls of the ways 13. The lower end of the shoe 2 is provided with a smooth face counter bore 15 extending to the top of the ways 13 above which the bore is threaded as indicated at 16. Into the end of the shoe 2 is inserted a bushing 17 fitting the smooth bore 15 and threaded to the threaded section 16. The outer cutters 14 of the core drill are engaged by the outer walls of the bushing 17, which thus serves to lock the cutters to the hollow shoe 2. The outer cutters are disposed so that the forward cutting faces 18 incline slightly outwardly and rearwardly as to the direction of the location of the core drill, which is counter-clockwise as viewed in Fig. 3, so that when the cutters are rotated the cuttings will be forced by such forward faces 18 of the cutters outward toward the ends of the cutters and thus prevented from packing against the central portions of the core drill.

The forward faces 18 are further tilted or inclined backward from the cutting edges of the cutters, the cutting edges being indicated at 19, to provide an effective cutting angle for the cutters as shown in Fig. 1. The bushing 17 is provided, at least throughout a portion of its length, with a roughened interior bore 20. The roughening of the bore, which is preferably in form of ledges or annular upwardly directed teeth 21, operates to facilitate building up of a core in the tool and to prevent the core from being dislodged therefrom, the top shoulders of the teeth 21 being preferably substantially horizontal as indicated in Fig. 2. The end of the bushing 17 is provided with mill teeth 22, the front cutting faces 23 of which are preferably inclined outwardly and rearwardly as to the direction of rotation of the tool, i. e. are disposed at an angle to radial lines to the teeth so that the cuttings from such teeth likewise are propelled outwardly and into position to be removed from the well by flushing fluid supplied to the core drill. The mill teeth 22 may be formed integral with the bushing 17 employed to retain the blade like cutters 14 in the ways 13, but preferably such mill teeth 22 are provided by a detachable mill 24 threaded to the bushing 17 as indicated at 25. The bore 26 of the mill 24 or a portion thereof is preferably smooth faced and where the smooth bore 26 terminates, indicated preferably at the end of the detachable mill 24 there is provided a distinct shoulder 27 above which the bores of the several parts receiving the core are of greater diameter than the bore 26 so that immediately upon passage of the core by the smooth bore 26, it is permitted to abruptly expand, thus removing pressure from the sides of the formed core, and providing a shoulder operative to prevent the core from being dislodged from the drill. The drill above the bore 26 being enlarged also permits free upward passage of the core.

Above the bushing 17 a portion of the bore of the hollow shoe 2 is indicated being provided with annular upwardly directed teeth 28 similar to the teeth 21 of the bushing 17, and above the teeth 28 the body or shoe 2 of the drill is threaded as indicated at 29 to the lower end of a core barrel 30, which extends upwardly into and spaced from the walls of the shank 7 in a position in alignment with the bore of the shoe 2. The barrel 30, in practice, may be composed of any number of sections coupled together as indicated at 31. The upper end of the core barrel 30 is threaded internally to a collar 32, which, in turn, is threaded to a seat member 34 providing a seat 35 for a lower ball 36, the upper end of the valve seat member 34 being threaded to a valve cage 37 providing a seat for a second ball 38 spaced vertically from the ball 36, the ball 36 being yieldingly maintained upon its seat by a coil spring 39 contacted at its upper end with the cage 37. The rise of the double check valve at the top of the core receiving barrel 30 with one of the valves having a tension means yieldingly maintaining the same closed, is found to efficiently prevent flushing fluid entering the barrel 30 and effecting the core therein.

Efficient means are employed to protect the core in the barrel 30. The types of core drills heretofore employed have been provided with a single valve member closing the core barrel. In use such a single valve fails entirely to protect the core in the barrel due to the pulsations of the pump, employed at the top of the well for forcing flushing fluid down to the core drill, vibrating the valve from its seat and admitting the flushing fluid into the core barrel where such fluid destroys the core therein. The use of the two vertically spaced valve members 36 and 38 has been found to eliminate such action and prevent the washing out of the core within the barrel 30. The lower member 36 being held down by the resilient means 39 materially aids in this action. By this structure we are enabled to successfully take cores from soft formations where such cores have hitherto been very improperly if at all obtained.

40 indicates flushing passages extending through the hollow shoe 2 to points intermediate the outer or blade formed cutters 14, through which flushing fluid may be directed to carry away the cutting forms during drilling operations.

With a core drill embodying this structure, the cuttings are all efficiently propelled outwardly from the core formed and into the passage of the flushing fluid. The wear elements of the core drill are made in small units which may be replaced at a relatively low cost and readily assembled and removed from the core drill.

While the form of rotary core drill herein described is well suited to perform the purposes of the present invention, various modifications may be made in the specific form of rotary drill described by way of the illustration and the invention is, therefore, not limited to the specific embodiment shown, but is capable of being embodied in various other forms all coming within the scope set forth in the following claims.

We claim:

1. A rotary core drill having a core receiving bore provided with annular toothlike shoulders upon which cuttings may pack during the operation of the drill, said drill including a hollow tool carrying shoe, a hollow tool securing bushing mounted on the lower end of the shoe, and an end mill secured in the lower end of said bushing.

2. A rotary core drill having a core receiving bore provided with annular toothlike shoulders upon which cuttings may pack during the operation of the drill, said drill including a hollow tool carrying shoe, a hollow tool securing bushing mounted on the lower end of the shoe, and an end mill mounted on the lower end of said bushing, said mill having a smooth interior bore and the bushing and the shoe having their bores toothed.

3. A rotary core drill having a core receiving bore provided with annular toothlike shoulders upon which cuttings may pack during the operation of the drill, said drill including a hollow tool carrying shoe, a hollow tool securing bushing mounted on the lower end of the shoe, and an end mill mounted on the lower end of said bushing, said mill having a smooth interior bore and the bushing and the shoe having their bores toothed, the bore of the mill being of less diameter than the smaller diameter of the toothed bore of the bushing and shoe.

4. A rotary core drill having a straight core-receiving bore provided with annular tooth-like shoulders for holding the core therein during operation of the drill, said drill including a hollow tool-carrying shoe, a hollow tool-securing bushing mounted on the lower end of the shoe, and an end mill secured in the lower end of said bushing.

5. A core bit comprising a body provided with a bore and circulation courses, reamer blades mounted on the body, and means for releasably securing the blades on the body, comprising a tubular member threadedly engaging the bore of the body.

6. A core bit comprising a body provided with circulation courses, reamer blades mounted on the body, and means for releasably securing the blades on the body, comprising tubular means threadedly engaging the body, and provided at its lower end with teeth.

7. A core bit comprising a body having radial slots in the lower end thereof, blades mounted in the slots, said blades and slots being of dove-tail form to prevent downward displacement of the blades from the body, and a core shoe removably fitted in the body and spanning the inner ends of said slots.

8. A core bit comprising a body having slots in the lower end thereof, blades mounted in the slots, said blades and slots being of dove-tail form to prevent downward displacement of the blades from the body, and a core shoe removably fitted in the body and spanning the inner ends of said slots.

9. A core bit comprising a body, blades on the body, coacting surfaces on the body and blades for preventing displacement of the blades from the body in two directions, and a core shoe removably fitted in the body for securing the blades against displacement therefrom in another direction.

Signed at Los Angeles, California, this 6th day of June, 1924.

ARTHUR F. SPENGLER.
ROBERT B. MORAN.